Figure 1:
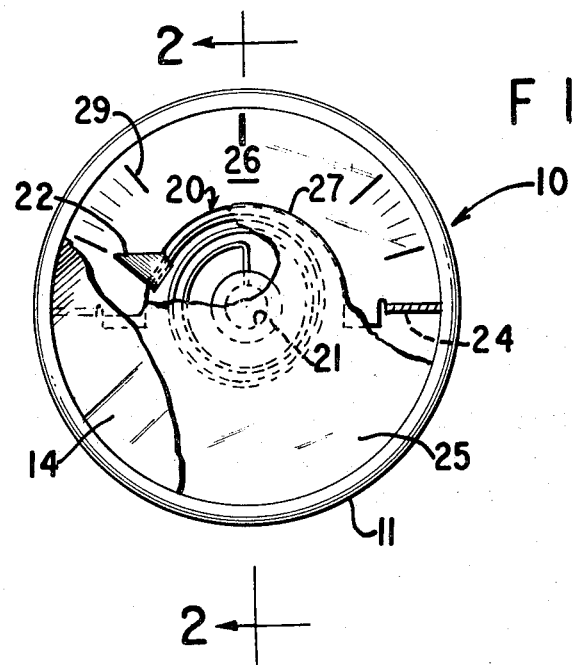

United States Patent [19]
Waite

[11] 3,730,000
[45] May 1, 1973

[54] STEPPED DIAL PRESSURE GAUGE

[75] Inventor: Ralph D. Waite, Sellersville, Pa.

[73] Assignee: Ametek, Inc., New York, N.Y.

[22] Filed: Feb. 12, 1971

[21] Appl. No.: 115,015

[52] U.S. Cl. ...................73/411, 73/418, 116/70, 116/129 R
[51] Int. Cl. ................................................G01l 7/04
[58] Field of Search.......................73/411, 418, 431; 116/129 T, 129 F, 129 S, 129 R, 70 AB

[56] References Cited

UNITED STATES PATENTS

| | | | |
|---|---|---|---|
| 1,717,653 | 6/1929 | Berge | 73/411 X |
| 3,213,688 | 10/1965 | Huston | 73/411 |
| 3,388,599 | 6/1968 | Mitchell | 73/431 X |
| 1,676,673 | 7/1928 | Stalker | 73/431 |
| 1,274,921 | 8/1918 | Manning | 73/411 |

*Primary Examiner*—Louis R. Prince
*Assistant Examiner*—Daniel M. Yasich
*Attorney*—D. Verner Smythe et al.

[57] ABSTRACT

A pressure gauge of the Bourdon tube type, especially useful in conjunction with fire extinguishers, has a diametrically extending step in its dial face with a central opening in the step and the Bourdon tube positioned in this opening. A pointer on one end of the Bourdon tube extends at right angles thereto and moves in the space between a viewing window of the gauge and the dial face rear portion which is spaced inwardly from the window. The pointer is bendable so as to be adjustable.

6 Claims, 2 Drawing Figures

Patented May 1, 1973   3,730,000

INVENTOR
RALPH D. WAITE
BY
Smythe & Moore
ATTORNEYS

STEPPED DIAL PRESSURE GAUGE

Pressure gauges of the Bourdon tube type have been widely used for fire extinguishers, especially small ones, to give an indication of the pressure in the extinguisher so that the probable effectiveness of the extinguisher is indicated. Such gauges are preferably small and inexpensive while at the same time must be reliably constructed so that an accurate determination of the extinguisher's condition can be quickly made. These gauges generally employ some form of pointer structure on a Bourdon tube with the pointer moving over an indicator scale on the dial face in response to the pressure sensed by the Bourdon tube. The structure must be provided to limit the movement of the pointer with respect to the dial face and also to provide for adjustment of the pointer to improve the accuracy of the readings. The conventional gauge construction provides a relatively narrow space between the dial face and viewing window for movement of the pointer. The narrow space restricts the type of adjusting structure which can be utilized for the pointer. Further, the usual stops for the pointer are provided in this narrow space.

One of the objects of the present invention is to provide an improved dial face for a pressure gauge of the Bourdon tube type.

Another of the objects of the present invention is to provide a pressure gauge of the Bourdon tube type having an improved dial face provided with integral stops for movement of the pointer and having increased space for movement of the pointer therein.

Another of the objects of the present invention is to provide a simple and relatively inexpensive pressure gauge of the Bourdon tube type having integral stops for the pointer and an improved structure for adjusting the pointer with respect to the Bourdon tube.

According to one aspect of the present invention, the pressure gauge comprises a casing having a viewing window in one end and a cylindrical supporting socket in the other end or at the bottom thereof. A Bourdon tube has one end mounted in the supporting post and a pointer attached to the other end of the Bourdon tube. A dial face has a substantially diametrically extending step therein to define a front portion which is adjacent the viewing window and a rear portion which is spaced inwardly from the front portion and substantially parallel thereto. The pointer is located between the viewing window and the dial face rear portion having indicia. The pointer extends upwardly from the Bourdon tube so as to be at right angles thereto and is bendable with respect to the Bourdon tube so as to be readily adjusted to fit therein. The step may be open in the center thereof with the Bourdon tube being disposed in this opening and between the front and rear dial face portions and may serve as a stop.

Other objects, advantages and features of the present invention will be apparent from the accompanying description and drawings, which are merely exemplary.

Figure 2:
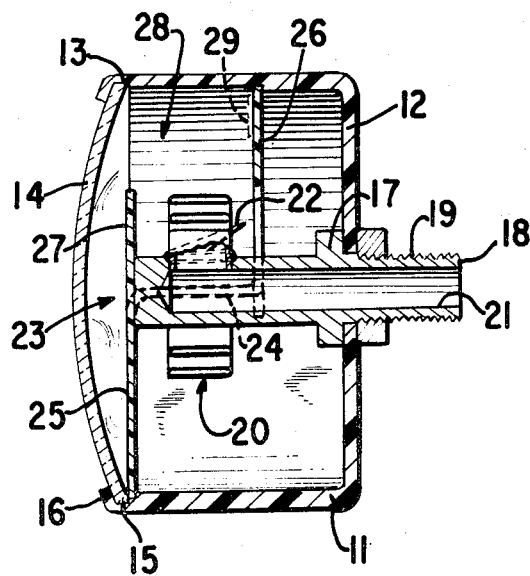

In the drawings:

FIG. 1 is a front view of the pressure gauge according to the present invention with a portion of the dial face being removed; and FIG. 2 is a sectional view taken along the line 2—2 of FIG. 1.

Proceeding next to the drawings wherein like reference symbols indicate the same parts throughout the various views, a specific embodiment of the present invention will be described in detail.

A pressure gauge incorporating the present invention is indicated generally at 10 (FIG. 1) which comprises a substantially cylindrical casing 11 having a closed rear wall 12 and an open front 13 which is covered by transparent viewing window 14 which may be mounted in an annular groove 15 formed in the inner cylindrical surface of the casing. The ends of the casing may be provided with flange 16 which extends over the edges of the viewing window to help secure the window in position.

In the rear wall 12 of the casing, there is mounted a cylindrical support or socket 17 which extends interiorly of the casing and has an exterior portion 18 provided with external threads 19 to facilitate mounting of the gauge. The socket may be in the side wall or take other forms.

On the interior portion of the socket 17, there is mounted Bourdon tube 20 which has one end 21 attached thereto so that the interior of the Bourdon tube communicates with the interior of the socket 17 to sense the pressure therein. The Bourdon tube 20 has a relatively flat cross section and on its outer end is provided with a pointer 22 which in the plane view extends at substantially right angles to the Bourdon tube. In the elevational view, the pointer is bent toward the dial. The pointer is constructed of a bendable material so as to be adjustable with respect to the Bourdon tube.

A unitary dial face, indicated generally as 23, has a diametrically extending step 24 to define a front portion 25 which is adjacent the viewing window 14 and a rear portion 26 which is spaced inwardly of the viewing window as may be seen in FIG. 2. The central portion of the step 24 is open and the opening may be partially obscured by an upstanding portion 27. The Bourdon tube 20 is positioned within the opening and between the front portion 25 and rear portion 26 of the dial face so as to be covered by the upstanding portion 27. The positioning of the dial face rear portion 26 to the rear of the viewing window defines a space 28 within which the pointer 22 moves. This space provides sufficient room for the pointer so as to eliminate the need to individually adjust the pointer to obtain clearance with respect to an indicating scale 29 on the dial face rear portion 26.

The step 24 provides stops adjacent the periphery of the dial face for movement of the pointer 22 within space 28. These stops are positive and are constructed integrally with the dial face. The positioning of the stops for the pointer is thus determined when the dial face is assembled in the instrument.

The positive stops accurately limit the movement of the pointer in either direction and eliminate the necessity for a separate assembly step of installing the conventional stop pins.

It will be understood that various details of construction and arrangement of parts may be made without departing from the spirit of the invention except as defined in the appended claims.

What is claimed is:

1. In a pressure gauge, a casing having a viewing window in one end and a socket means in the other end, a Bourdon tube having one end mounted in said socket means, a pointer on the other end of said Bourdon tube, a unitary dial face having a step therein and comprised of portions adjacent the outer periphery of said dial face to define a front portion adjacent said viewing window and a rear portion spaced inwardly from said front portion, said Bourdon tube and the pointer thereon being located between said dial face front and rear portions and between said portions, said front portion being spaced from said rear portion to provide room to receive said Bourdon tube and said pointer.

2. In a pressure gauge as claimed in claim 1 wherein said step is diametrically positioned on said dial face.

3. In a pressure gauge as claimed in claim 1 wherein said step intersects the central axis of the gauge.

4. In a pressure gauge as claimed in claim 1 wherein said pointer extends upwardly from the Bourdon tube and substantially at right angles thereto.

5. In a pressure gauge as claimed in claim 4 wherein said pointer is bendable with respect to said Bourdon tube so as to be adjustable therewith.

6. In a pressure gauge as claimed in claim 1 wherein said pointer is engageable with the dial face step to limit the movement thereof.

* * * * *